Aug. 9, 1966 C. F. CONSTABLE 3,265,158
INDUSTRIAL TRUCKS

Filed March 23, 1965 5 Sheets-Sheet 1

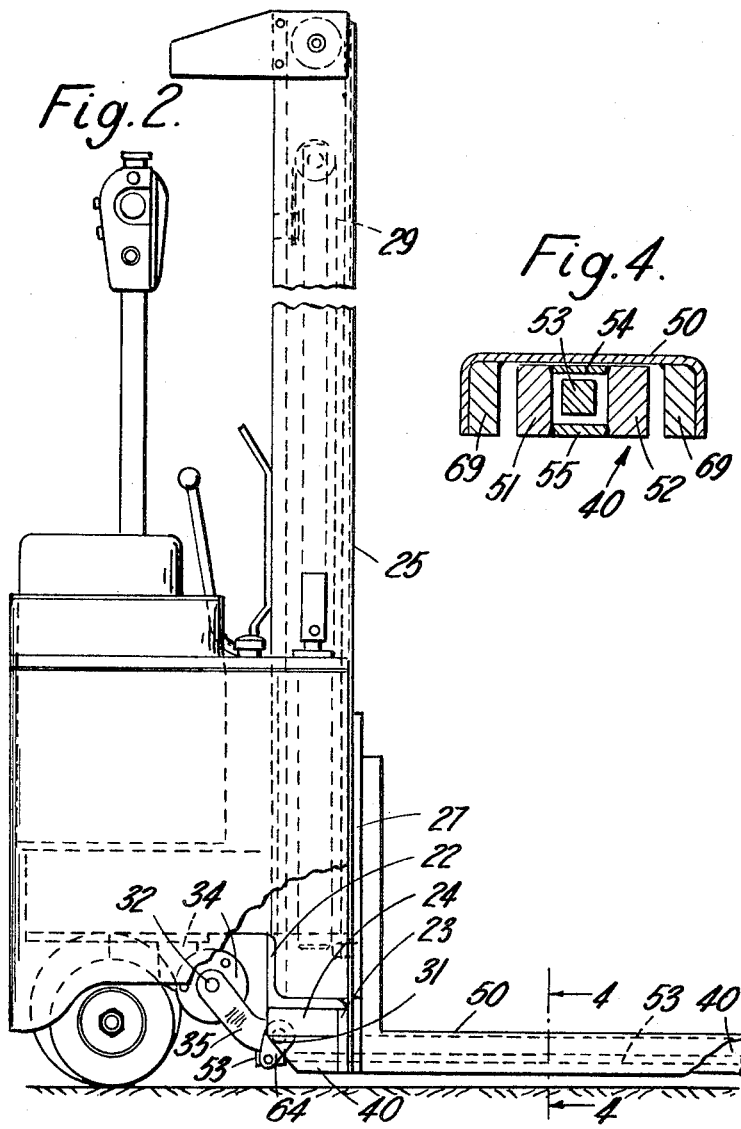

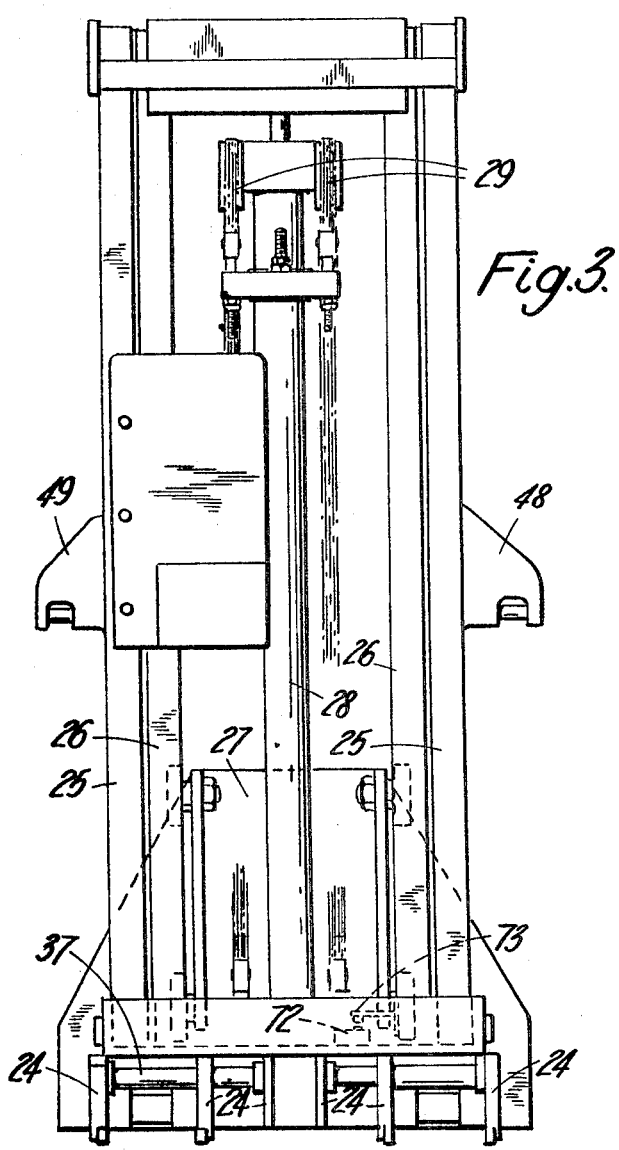

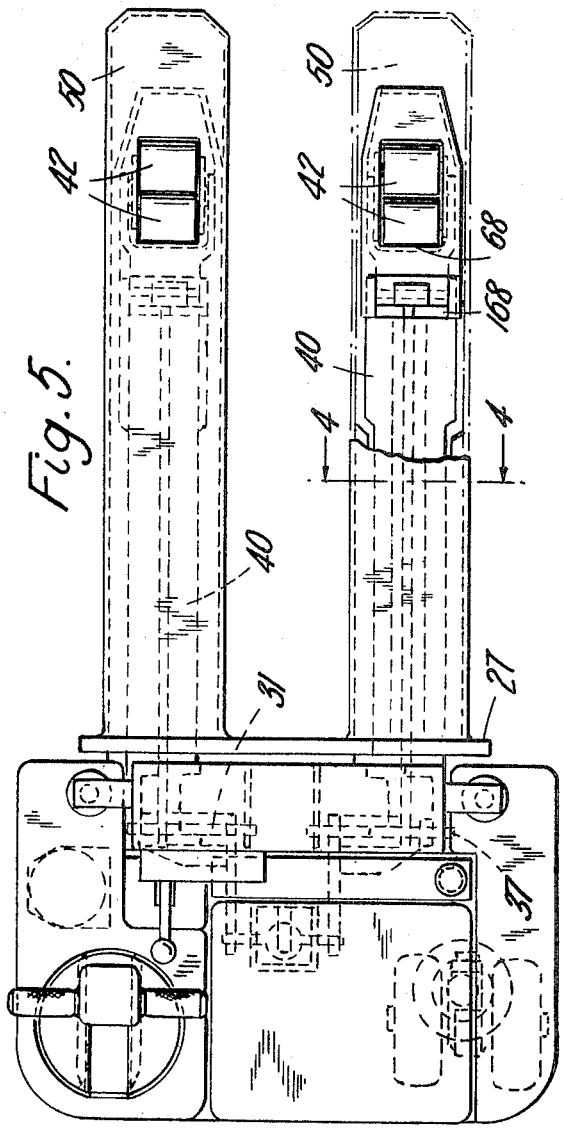

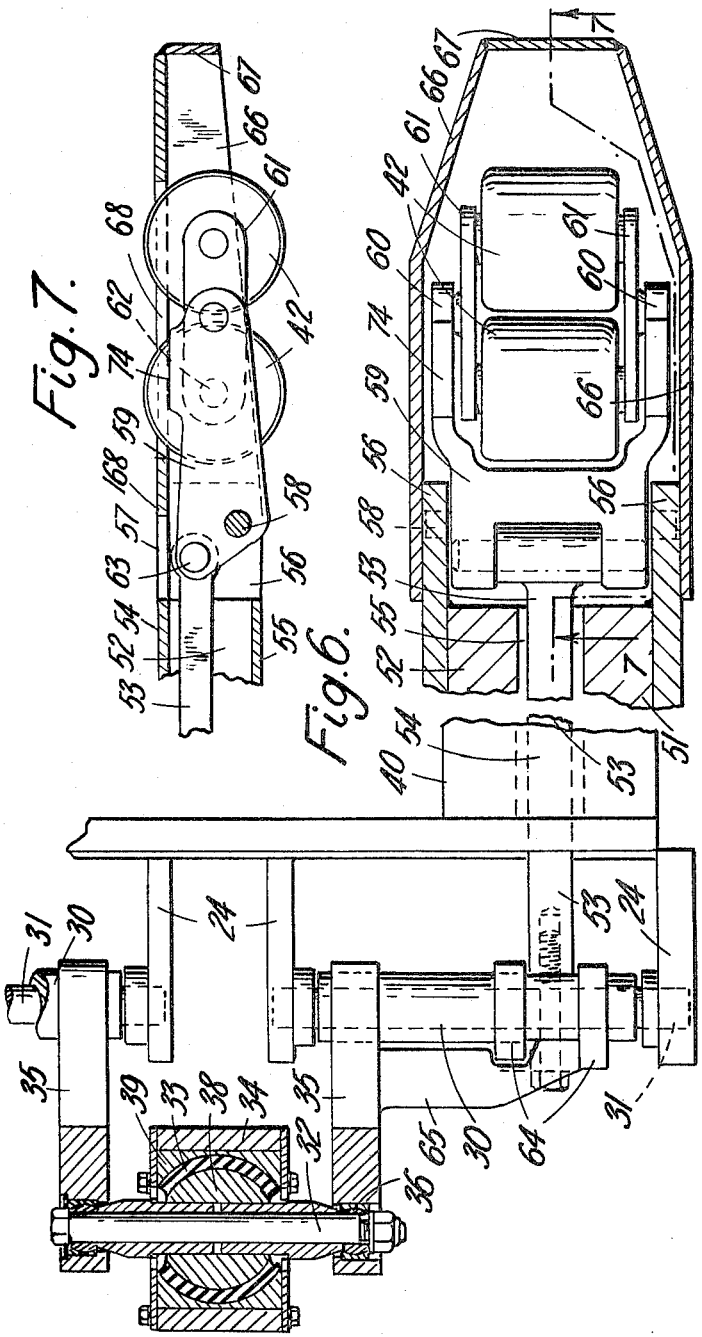

United States Patent Office 3,265,158
Patented August 9, 1966

3,265,158
INDUSTRIAL TRUCKS
Charles Frederick Constable, Basingstoke, England, assignor to Lansing Bagnall Limited, Basingstoke, England, a British company
Filed Mar. 23, 1965, Ser. No 442,069
Claims priority, application Great Britain, Mar. 24, 1964, 12,460/64
7 Claims. (Cl. 187—9)

This invention relates to improvements in or relating to industrial trucks.

The usual truck known as a pallet truck, comprises a body portion resting upon steerable wheels and legs projecting forward from the body portion which contain at their front ends rollers to run on the ground, which rollers are mounted on a cradle linked to mechanism in the body of the truck by which the cradle can be moved to lift the legs relatively to the rollers, the mechanism at the same time lifting the rear ends of the legs adjacent to the body so that the clearance between the legs and the ground is increased. In use the legs are lowered close to the ground to run underneath a pallet and then raised to take the weight and to allow ground clearance beneath the legs. In this type of truck there is no mast.

In a masted truck there are forks on a carriage which runs up and down the mast and the forks project forwardly from the mast without any rollers in them but they can be brought close to ground level to enter beneath the pallet and the load can then be lifted as high as the mast will allow, which is a much greater height than the lift of the fork legs of a pallet truck. With a fork truck there must be a very heavy counter-weight at the back of the body to balance the load on the forks or else the truck has to be provided with straddle legs which extend forwardly outside the line of the forks and carry rollers at their front ends, the straddle legs being wide enough apart to permit the forks to be lowered to ground level between them.

It has been proposed also to make a fork lift truck with legs like straddle legs which were made as shallow as possible and of the same spacing as the fork arms and to make the fork arms hollow so that they could descend over the legs, thereby saving width in the truck but in this case the straddle legs necessarily had an extremely small ground clearance and they were liable to foul irregularities in the floor.

According to the present invention a truck having a body-portion, a mast with a lifting-carriage and fork-arms upon it, which fork-arms are made hollow in their underside, and legs projectiong forwardly from the lower end of the mast of such dimensions and so located as to enable them to fit into the undersides of the fork arms when the latter are lowered, is characterised by the fact that the mast and legs are movable up and down relatively to the body, the legs are of a box-section for the greater part of their length, each with a hollow tip which is pierced to receive a cradle of the full depth of the legs and with rollers of which the upper surfaces are nearly flush with the upper surfaces of the legs, the cradles are linked, by rods passing through the box-section legs, with the means for moving the mast up and down, and the total depth of the legs and fork-arms when fitted one into the other is not greater than will permit them to enter together into a normal pallet.

By this means a two-fold result is attained: In the first place the ground clearance after a load has been lifted by the fork arms can be made adequate for running over irregular floors and in the second place in suitable instances, after the fork arms have been used to lift a load, the legs can be used as the legs of a pallet truck to lift a further load beneath the fork arms.

It is necessary in order to make a truck according to the present invention suitable for lifting normal pallets, to make the legs which they enclose very shallow and a suitable design which gives adequate strength for this purpose in spite of the shallowness forms a further feature of the invention hereinafter described. Further features of the invention relate to the disposition of the lifting mechanism for the legs so that it does not interfere with the movement of the carriage nor with the general compactness of the truck.

It will be understood that pallets of the kind which can be lifted by the fork arms according to the present invention must be similar to those which are normally employed with pallet trucks, that is to say, they must be single deck pallets, open at the bottom so that they do not interfere with or become entangled in the leg structure.

The following is a description, by way of example, of one construction in accordance with the invention.

In the accompanying drawings,

FIGURE 2 is a side elevation;

FIGURE 3 is a rear elevation of the mast structure, detached from the body;

FIGURE 4 is a section upon the line 4—4 of FIGURES 2 and 5, looking in the direction of the arrows;

FIGURE 5 is a plan of the truck with one of the fork arms broken away to show the underlying straddle leg;

FIGURE 6 is a plan, partly in section, of the mechanism for lifting the straddle legs; and FIGURE 7 is a section upon the line 7—7 of FIGURE 6.

Figure 1:
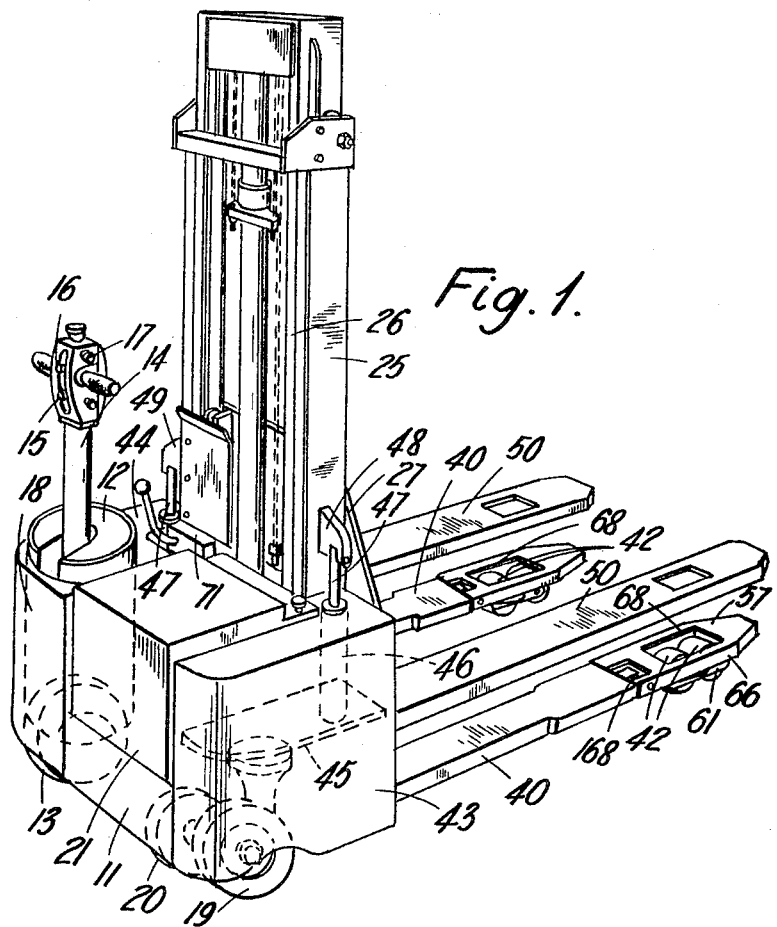
FIGURE 1 is a perspective view of a truck as seen from the rear and one side.

The body of the truck comprises a box-shaped structure 11 open at the bottom which extends part of the way across the width of the truck and which is extended for the remainder of the width by horizontal brackets which support at one side a standard power-driven turntable mounting 12 carried on a ground wheel 13 and capable of being steered by a tiller arm 14 at the top of the turntable mounting. The power in the turntable mounting consists of an electric motor which is geared to the ground wheel 13 and as this is a standard construction of mounting and ground wheel and the tiller arm 14, with the control buttons 15, 16, 17 mounted thereon, is also of standard construction, these parts will not be herein further described. They are enclosed by a casing 18 secured to the brackets. Side by side with the driven ground wheel 13 there is mounted beneath the hollow box-shaped portion of the body a duplex castor wheel 19–20 also of standard construction and upon the top of the box-shaped portion of the body is a battery box 21 which supplies power for the electric motor.

Across the front of the body and extending for the whole width of the truck is a heavy movable angle iron 22 (FIGURE 2) with one of its flanges projecting forward horizontally from its lower edge. At the front of this horizontal flange there is welded a heavy vertical plate 23 which extends horizontally for the width of the truck and the lower edge of which is close to ground level. Beneath the horizontal flange of the angle iron and the vertical plate there are several vertical gusset plates 24 which are welded in place and serve to stiffen the construction and provide for the attachment of working parts. To the angle iron 22 in the front of the body there is welded a mast consisting of two vertical channel members 25 with their flanges directed towards one another. Within these channel members there may, if desired, be an inner rising mast and this also consists of channel members, 26, with their flanges directed inwards. On the inside of the channel members (the rising ones if there is a rising mast) there runs a fork carriage 27 and the usual means for raising and lowering the fork carriage by a hydraulic cylinder 28 and chain gear 29 is provided. These parts are of standard construction and need not be further described.

The assembly of the mast 25 with its angle iron base 22 and gusset plates 24 is supported at the bottom on two levers 30 which are mounted on rock-shafts 31 (FIGURE 6) fixed in the gusset plates 24 and extending transversely beneath the centre of the box-shaped hollow body 11. The levers 30 carry lever arms 35 which are united by a rock-shaft 32 which is supported on a spherical rubber bush 33 held in a bracket 34 welded to the body. The attachment of this shaft 32 to the lever arms 35 at its ends is also by spherical bushes 36. The effect is that the two levers 30 with their lever arms 35 are compelled to rock together but the rubber bush 33, which is bonded to the spherical member 38 in the rock-shaft 32 and to the casing 39 on the bracket 34, allows a slight difference in their angular movement, and permits the lever on one side of the bracket to rock slightly more or less than the lever on the other side. If the mast 25 is lifted with its angle iron 22, as it can be by jacks about to be described, it will be appreciated that the lever arms 35 rock about their centres on the rock-shaft 32 and carry the bottom of the mast upward in an arcuate path which centres upon the axis of the rock-shaft 32. As the mast is in one piece with forwardly projecting legs 40, later described, which legs carry rollers 42 to run on the ground, this relative movement of the arms 35 is transmitted through linkage, later described, to the rollers 42 and permits independent movement of the rollers so that the truck can rest firmly on an uneven floor.

The body 11 has casings 43, 44 one on each side, which extend around the sides of the mast 25 and contain horizontal plates 45 which support two upright jack cylinders 46. The cylinders 46 and their rams 47 constitute short-stroke lifting jacks and they are arranged on a vertical axis. The rams 47 of the jacks project upwardly above the casings 43, 44 and the backs of the outside channel members 25 of the mast carry horizontally projecting arms 48, 49 which are connected to the top of the rams 47 of the jacks. Thus, by extending the jacks, the mast can be lifted and as its lower end is guided by the lever arms 35 on the rock-shaft 32 it can be raised or lowered by a stroke of, say four inches.

The lever arms 35 at the bottom of the mast extend to the mast, when in its lowermost position, downwardly and forwardly from their fixing on the bracket 34 within the box-shaped body and therefore the mast as it rises will be tilted slightly backwards. This tilt is an advantage in helping to stabilize any load carried on the fork arms 50 which are mounted on the carriage 27 which runs on the mast.

As already explained, the pallet legs 40 extend forwardly from the vertical plate 23 which is gussetted to the angle iron 22 at the base of the mast. These legs have to be shallow and also narrow enough to enable the fork arms 50 mounted on the rising carriage to fit over them when the carriage is lowered, without requiring the fork arms 50 to be any wider than the normal width for engaging beneath a palleted load. Moreover, the pallet legs 40 must be shallow enough to allow the total depth of legs 40 plus fork arms 50 to be small enough to engage beneath a normal pallet. To this end, each pallet leg 40 (see FIGURE 4) consists of two rectangular bars 51, 52 which are let through the vertical plate 23 and welded to it and to the gusset plates 24. The depth of these bars is equal to the maximum depth permissible within the fork arms 50 which are hollow as shown to enclose them. They are spaced apart sufficiently to permit the passage between them of an operating rod 53 for the cradle which carries the rollers 42 and their thickness is as great as the space allows. They are united together between their upper portions by a horizontal plate 54 welded between them with its upper surface flush with their upper surfaces. A similar flush plate 55 unites their lower portions and the result is a square opening running through each pallet leg from one end to the other for the operating rod 53 above referred to. At the front end of each of these bars, which are thus welded into a box-shaped structure, there are welded at the sides extension brackets 56 (FIGURE 6) which are united by a top plate 57 (FIGURE 7) welded to them. These brackets are bored to receive a horizontal pivot 58 and on the pivot is pivoted a heavy forked lever 59. Fork arms 60 of the lever 59 extend forwardly from the pivot and support two cradle plates 61 pivoted between them. The cradle plates 61 carry axles 62 for the two ground rollers 42. The lever 59 also has above its pivot a horizontal pin 63 which is jointed to the end of the square rod 53 which passes through the centre of the hollow pallet leg 40. Thus, if pressure is applied to the rod 53, the lever 59 will be urged downwardly and the cradle plates 61 with their rollers 42 will, as the rollers are resting on the ground, cause the front end of each pallet leg to be lifted.

The square operating rod 53 which moves the cradles 61 in the manner just described, is connected at the back of each pallet leg between a pair of downwardly projecting arms 64 on one end of the lever 30 which extends between the gusset plates 24. The lever arms 35 on which the mast is carried, and the arms 64 which are pivoted to the operating rods 53, are rigidly connected together on the lever 30 and also by lateral extensions 65 on the lever arms 35, which lateral extensions are welded to the lever arms 64 which operate the cradles. Thus, when the mast is lifted, the cradles cause the front ends of the pallet legs to be lifted and the parts are so proportioned that lift at the front on rollers 42 occurs to a corresponding extent to the lift of the mast. It will be noted that the cradle mechanism and its operating lever 59 all project forwardly from the front of the pallet leg 40 and are not enclosed thereby. This enables space to be saved for the fork arms. The mechanism is however protected by the plate 57 already referred to and by side plates 66, 67, welded around its edges. In the plate 57 is an aperture 68 to allow the rollers 42 plenty of room. A further aperture 168 is provided in the plate 57 to allow pivotal movement of the lever 59.

The fork arms 50 which project forwardly from the bottom of the carriage 27 on the mast consist of stout plate which is bent over to form an inverted channel-shape as shown in FIGURE 4 with the side flanges of the channel projecting downwardly so as to enclose the pallet legs. Reinforcing plates 69 are welded to the inside of this inverted hollow channel along each side of the pallet legs and the reinforcing plates extend from the carriage 27 forwardly as far as the brackets 56 which support the cradle-carrying lever 59 but the forward part of the fork arms is not reinforced in this way because it is not necessary for strength as the principal bending moment comes near the root of the fork arms on the carriage and the omission of the reinforcing plates in the forward portion of the fork arms allows room for the levers 59 and cradle 61 which carries the ground rollers 42. Thus the whole problem of providing a lifting pallet leg which is enclosed by a hollow fork arm of normal dimensions is solved. The resulting truck is strong and rigid and, as already pointed out, it is capable of carrying a lifted load on the fork arms 50 and a further load below it on the pallet legs 40, in suitable cases. It also does not require a counter-balance-weight at the back of the body, like a common fork truck, and therefore the whole structure is light in weight for the work which it is capable of performing.

In the operation of this truck, the push buttons 15 and 16 are operated to lift and lower respectively, the pallet legs 40 through the actuation of the jacks 46. The forks 50 can be raised or lowered by operation of the hydraulic valve 71 which controls the hydraulic jack 28 and in order to maintain stability of the truck, interlocking means are provided which lower the pallet legs 40 when the forks 50 reach a predetermined height. These means comprise a micro switch 72 mounted on the horizontal flange of the angle iron 22 (FIGURE 3) and a switch operating arm 73 fixed to the base of the inner mast 26. The switch 72 is connected in the circuit of the push buttons and automatically isolates them and causes the legs to lower when it is operated by the inner mast commencing to rise when the forks are say twelve inches from the ground. Thus, as the forks are raised to a higher level, the truck remains stable since when the legs are in their lowered position, the independent pivotal movement of the levers 59 in each leg, permitted by the resilient mounting of the shaft 32 is restrained by portions 74 of each leg being engaged by the underside of the plate 57. This action prevents the truck mast from rocking sideways to any large extent, which would occur if the legs 40 were raised and a load carried by the raised forks were not central and therefore applied an extra force to one side of the truck and so caused the lever 59 on that side of the truck to be depressed more than the lever on the other side.

I claim:

1. A truck having a body-portion, a mast with a lifting-carriage and fork-arms upon it, which fork-arms are made hollow in their underside, and legs projecting forwardly from the lower end of the mast of such dimensions and so located as to enable them to fit into the undersides of the fork arms when the latter are lowered, characterized by the fact that the mast and legs are mounted on the body by means permitting them to move up and down relatively to the body, the legs are of a box-section for the greater part of their length, each with a hollow tip which is pierced to receive a roller-carrying member and roller of the full depth of the legs, the roller-carrying members are movable up and down by operating rods passing through the box-section legs, the operating rods being linked with the means for moving the mast up and down, and the total depth of the legs and fork-arms when fitted one into the other is not greater than will permit them to enter together into a normal pallet.

2. A truck as claimed in claim 1 wherein the mast is guided at the bottom for its movement up and down, on links pivoted to the body, which links have lever arms to engage the said operating rods, and is supported at a higher level by upright piston-and-cylinder means carried by the body of the truck.

3. A truck as claimed in claim 2 wherein the piston-and-cylinder means are operated by fluid pressure under the control of an interlock with the means for raising the fork-carriage, so that at any time when the fork-carriage raising means is operated, if the legs are in a raised position and if the fork-arms are at a height above the legs in their said raised position, the piston-and-cylinder lifting means for the legs and mast will be retracted and the legs lowered.

4. A truck as claimed in claim 2 wherein the links which guide the lower end of the mast extend from the body downwardly and forwardly so that the mast as it rises is tilted backwards.

5. A truck as claimed in claim 2 wherein the links are interconnected so that they rotate together, the interconnecting means allowing a slight yielding movement in the interconnection, to enable the truck to stand firmly on an uneven floor.

6. A truck as claimed in claim 3 wherein the links which guide the lower end of the mast extend from the body downwardly and forwardly so that the mast as it rises is tilted backwards.

7. A truck as claimed in claim 1 wherein the operating rods are linked with the means for moving the mast up and down by links interconnected so that they rotate together, the interconnecting means allowing a slight yielding movement in the interconnection, to enable the truck to stand firmly on an uneven floor.

References Cited by the Examiner
UNITED STATES PATENTS

| | | | |
|---|---|---|---|
| 2,355,328 | 8/1944 | Quayle | 187—9 X |
| 2,417,395 | 3/1947 | Framhein. | |
| 2,643,740 | 6/1953 | Quayle | 187—9 |
| 2,789,648 | 4/1957 | Huffman | 187—9 X |
| 3,202,233 | 8/1965 | Dolphin et al. | 187—9 X |

SAMUEL F. COLEMAN, *Primary Examiner.*